WAVE TRANSLATING DEVICE

Filed March 5, 1949

INVENTOR
S. DOBA, JR.
BY N. D. Ewing
ATTORNEY

UNITED STATES PATENT OFFICE 2,521,116

WAVE TRANSLATING DEVICE

Stephen Doba, Jr., Whippany, N. J., assignor to Bell Telephone Laboratories, Incorporated, New York, N. Y., a corporation of New York Application March 5, 1949, Serial No. 79,749

7 Claims. (Cl. 332—49)

This invention relates to balanced vacuum tube modulators and has for its principal object the accurate balancing out of carrier frequency currents introduced into the output circuits of such modulators.

Another and more particular object is to balance out such currents without adversely affecting the transmission characteristics of the modulator.

In the transmission of electrical waves by the process of carrier amplitude modulation, it is, under some circumstances, advantageous to control the amplitude of the carrier and to reduce it to a low value. For this purpose, various forms of balanced modulators have been developed, enabling the amplitude of the carrier to be reduced or even suppressed entirely.

If the typical balanced vacuum tube modulator is truly balanced, no carrier currents will be transmitted to the modulator output circuit, since those appearing in the individual tube output circuits cancel each other. At high frequencies, however, parasitic tube capacitances become important and vary the phase as well as the amplitude of the carrier frequency currents flowing in the individual tube output circuits. As the modulator tubes are usually not exactly similar to each other, the phase-displaced currents will generally not cancel each other in the modulator output circuit and unwanted carrier frequency current will appear in the modulator output.

The phase-displaced carrier frequency currents which tend to appear in the individual tube output circuits at high frequencies may be considered to be made up of two components, an in-phase component and a quadrature component 90 degrees out of phase with the in-phase component. According to the principal feature of the present invention, an additional amount of carrier current is shifted 90 degrees in phase and is introduced, controllable in magnitude and direction, into the individual tube output circuits to balance out or nullify similar current components introduced by the various parasitic capacitances. An additional capacitance is connected across one of the modulator tubes and a capacitance and a variable portion of the carrier voltage are added across the other modulator tube. If the carrier is introduced into the cathodes of the modulator tubes, the carrier source may be shunted by a potentiometer, with the above-mentioned variable portion of the carrier voltage appearing between one carrier source terminal and the movable tap of the potentiometer.

A more thorough understanding of the present invention will be obtained from a study of the following detailed description and the accompanying drawings. In the drawings.

Figure 1:
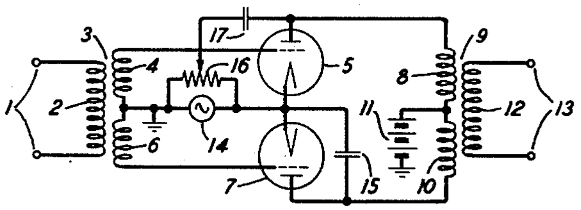
Fig. 1 shows a simplified embodiment of the invention.

Referring particularly to Fig. 1, there a pair of input terminals 1 are connected to the primary winding 2 of an input transformer 3 which has a divided secondary winding. One portion 4 of the secondary of transformer 3 is connected to the control grid of a vacuum tube 5. The other portion 6 is connected to the control grid of a tube 7 and the common point of portions 4 and 6 is grounded. The anode of tube 5 is connected to one portion 8 of the divided primary winding of an output transformer 9. The other portion 10 of the divided primary of transformer 9 is connected to the anode of tube 7. A plate supply battery 11 is connected between the common point of windings 8 and 10 and ground and the secondary winding 12 of transformer 9 is connected to a pair of output terminals 13. A carrier supply source 14 is situated between the cathodes of tubes 5 and 7 and ground.

The elements thus far enumerated comprise a conventional push-pull balanced modulator circuit, which has been used in the past to reduce or suppress the amplitude of the carrier. When a signal is applied to input terminals 1, the modulated wave obtained from the plate circuits of tubes 5 and 7 is available for transmission at the secondary or output winding 12 of transformer 9. If the modulator tubes 5 and 7 are identical in characteristics and if the impedances of windings 8 and 10 of transformer 9 are identical, it is well known and can be readily shown that no carrier frequency currents will appear in output winding 12.

This simple analysis fails, however, when the frequency of carrier source 14 is relatively high in that it neglects the role played by various parasitic capacitances. These capacitances are the interelectrode capacitances, i. e., anode-cathode, cathode-grid, and grid-anode, of tubes 5 and 7. The amount of carrier frequency current appearing in the individual output or plate circuits of tubes 5 and 7 and in output winding 12 is affected by the magnitude of all these capacitances, as well as the impedances of windings 4 and 6 of transformer 3 and the factors previously mentioned.

The effect of these parasitic capacitances is to vary the phase as well as the amplitude of the currents flowing through windings 8 and 10 of output transformer 9. Where the effect on the amplitude has been small and the net effect has been essentially a change in phase, the usual method of correction has been to alter the phase angles of windings 8 and 10 relative to each other. This may be done, for example, by placing variable condensers across one or both of these windings. In this way, a balance may be once more obtained and the carrier current in output winding 12 reduced to a low value.

The above-noted method of correction has the disadvantage that, when large amounts of correction are used, the additional capacitances across windings 8 and 10 have effects on the transmission characteristics of transformer 9. Those effects are in general undesirable, particularly in view of the fact that they vary with the amount of compensation used. The amount of compensation required in turn varies with the particular vacuum tubes and circuit elements used.

In accordance with the present invention, modulator balance is achieved by controlling the phase balance without adversely affecting the transmission characteristics of transformer 9. A fixed capacitance 15 is connected between the anode and the cathode of tube 7. The resistance arm of a potentiometer 16 is connected across carrier source 14 and a capacitance 17 is connected between the variable tap of potentiometer 16 and the anode of tube 5.

Since two tubes seldom have exactly the same parasitic capacitances, it is difficult to determine in advance the direction of the unbalance produced by such capacitances. For that reason, capacitance 15 is made large enough to insure that the quadrature component of carrier current introduced into winding 10 by capacitance 15 and the parasitic capacitances of tube 7 will be greater than that introduced into winding 8 by the parasitic capacitances of tube 5, regardless of which tube has the greater parasitic capacitances. Carrier current is then introduced into winding 8 through potentiometer 16 and capacitance 17. The current so introduced is shifted 90 degrees in phase by capacitance 17 and its amplitude may be varied by changing the setting of the slider of potentiometer 16 until the quadrature current in winding 8 is equal to and balances out that in winding 10.

To provide for the eventuality that the quadrature components of carrier frequency current appearing, due to parasitic capacitances, in the plate circuits of tubes 5 and 7 and in windings 8 and 10 may be equal, the value of capacitance 15 is made smaller than, preferably one-half, the value of capacitance 17. Then, if the resistance of potentiometer 16 is considerably smaller than the reactance at the carrier frequency of capacitance 17, a balance of carrier frequency currents in windings 8 and 10 of output transformer 9 may be obtained by setting the slider of potentiometer 16 midway between its two extreme positions.

If, on the other hand, the values of the parasitic capacitances are such as to cause an excess of carrier frequency current to flow through winding 10, the unbalance may be removed by moving the slider of potentiometer 16 closer to its ungrounded terminal, causing more current to flow through winding 8. Conversely, if there is an excess of carrier frequency current in winding 8, a balance may again be achieved by moving the slider of potentiometer 16 closer to its grounded terminal, causing less current to flow through winding 8.

It is to be noted that the reactances across windings 8 and 10 remain constant and are unaffected by the degree of balancing required. The only disturbing factor is the resistance of potentiometer 16 and that factor may be minimized or reduced to negligible proportions by making the resistance of potentiometer 16 very small in comparison with the reactance, at the carrier frequency, of capacitance 17.

Figure 2:
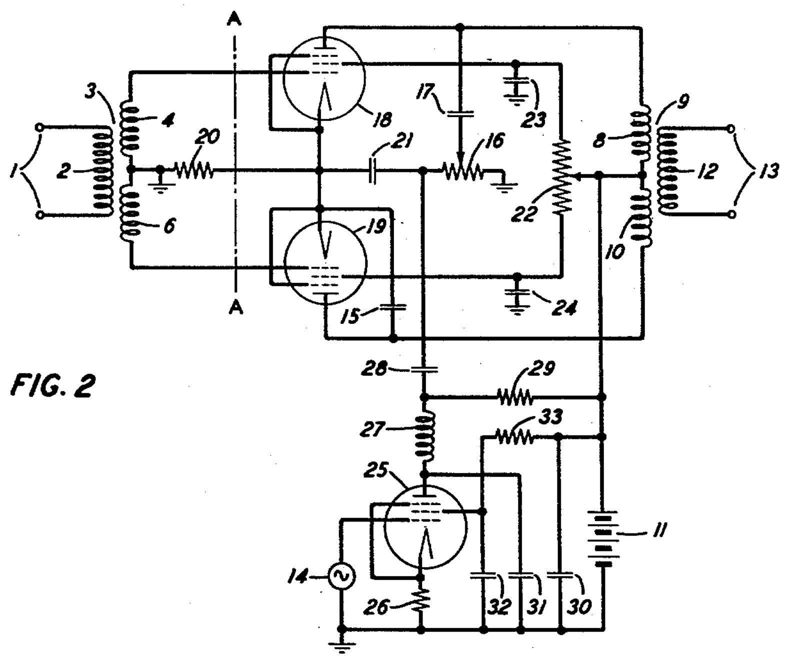
Fig. 2 shows a more complete modulator circuit embodying the invention.

A more complete balanced modulator circuit employing an embodiment of the invention is illustrated in Fig. 2. Elements corresponding to those already described in connection with Fig. 1 have been given similar reference numerals.

In Fig. 2, a pair of input terminals 1 are again connected to the primary winding 2 of an input transformer 3. A secondary winding 4 of transformer 3 is connected to the control grid of a vacuum tube 18. The other secondary winding 6 is connected to the control grid of a tube 19. The common point of windings 4 and 6 is grounded.

Tubes 18 and 19 are preferably of the pentode type shown and their cathodes are connected through a common biasing resistance 20 to ground. The signal voltages applied to the control grids of tubes 18 and 19 by way of transformer 3 are in a so-called push-pull relationship. The suppressor grids of tubes 18 and 19 are connected to the respective cathodes of the tubes.

The anode of tube 18 is connected to one portion 8 of the divided primary winding of output transformer 9 and the other portion 10 of the divided primary is connected to the anode of tube 19. The common point of windings 8 and 10 is connected through plate supply battery 11 to ground. The secondary or output winding 12 of transformer 9 is connected to the output terminals 13. One side of the carrier frequency oscillator 14 is connected through a buffer amplifier, the construction of which will be described later, to a point between a coupling capacitance 21 and the resistance arm of the potentiometer 16. The other side of oscillator 14 is grounded as is the other side of the resistance element of potentiometer 16. The other side of capacitance 21 is connected to the cathodes of tubes 18 and 19.

Balancing capacitance 17 is connected, as before, between the anode of tube 18 and the slider of potentiometer 16. Balancing capacitance 15, which is preferably one-half as large as capacitance 17, is connected between the anode and cathode of tube 19.

Potentials for the screen grids of tubes 18 and 19 are obtained from battery 11 through a potentiometer 22. The resistance arm of potentiometer 22 is connected between the screen grids of tubes 18 and 19 and the slider is connected to the positive side of battery 11. Two capacitances 23 and 24 are connected between the screen grids of tubes 18 and 19, respectively, and ground, and serve as by-pass elements. To fulfill this by-pass function capacitances 23 and 24 should be large so as to have very small reactances in the frequency range involved.

The purpose of balancing capacitances 15 and 17 has been explained in connection with Fig. 1. The purpose of potentiometer 22 is to provide an adjustment, independent of the capacitance balance adjustment, to compensate or correct for inequalities of the transconductances of tubes 18 and 19 in causing currents of carrier frequency to flow in windings 8 and 10 of output transformer 9. This purpose is accomplished by adjusting the slider of potentiometer 22, thus varying the potentials of the screen grids of tubes 18 and 19 in a complementary manner.

If vacuum tubes 18 and 19 were identical in all respects and if the slider of potentiometer 22 were set midway on the resistance arm, the potential drops due to the screen currents between the slider and either end of the resistance arm of potentiometer 22 would be equal. Therefore, under the assumed identity of tubes 18 and 19, the carrier frequency currents flowing in windings 8 and 10 of output transformer 9 due to this cause alone would be equal. If the impedances of windings 8 and 10 were equal, there would be no current of carrier frequency flowing in output winding 12.

If it is desired to have some current at carrier frequency flow in the output winding 12, the slider of potentiometer 22 may be displaced from the midpoint of the resistance arm, thus varying the relative potentials of the screen grids of tubes 18 and 19 and thereby varying the transconductances of tubes 18 and 19.

Since the carrier current flow due to the tranconductances of tubes 18 and 19 is essentially free of reactance effects, the in-phase component of carrier frequency output is adjusted by varying the position of the slider of potentiometer 22. Since the flow of carrier current controlled or determined by balancing capacitances 15 and 17 depends on the reactances of those elements, the quadrature component of carrier frequency output is adjusted by varying the position of the slider of potentiometer 16. With the two adjustments, which are independent of each other, both the amplitude and the phase of the carrier frequency output can be controlled.

A version of the circuit shown in Fig. 2 has been adapted for use in the transmission and reception of video signals. The following values are given for certain of the circuit elements by way of example:

Capacitance 15—1.5 micromicrofarads.
Resistance element of potentiometer 16—200 ohms
Capacitance 17—3 micromicrofarads
Tubes 18 and 19—Western Electric 349A pentodes
Resistance 20—430 ohms
Capacitance 21—10,000 micromicrofarads In the actual system the carrier frequency was in the vicinity of 8 megacycles and the input modulating signal covered a frequency band of from 0 to 2.8 megacycles. A plate supply voltage of 300 volts was used.

The previously-mentioned buffer amplifier stage amplifies the carrier frequency voltage furnished by oscillator 14 and delivers power at that frequency at a low impedance to modulator tubes 18 and 19.

The ungrounded side of oscillator 14 is connected to the control grid of a vacuum tube 25, which is preferably a pentode. The suppressor grid and the cathode of tube 25 are connected together and a biasing resistance 26 is connected between the cathode and ground. An inductance 27 is connected to the anode of tube 25 and a coupling capacitance 28 is connected between inductance 27 and the juncture between capacitance 21 and potentiometer 16. A dropping resistance 29 is connected between inductance 27 and the positive side of plate supply battery 11. Battery 11 is shunted by a by-pass capacitance 30 and a capacitance 31 is connected between the anode of tube 25 and ground. The screen grid of tube 25 is by-passed to ground through a capacitance 32 and is connected through a dropping resistance 33 to the positive side of battery 11.

Inductance 27 and capacitance 31 are essentially in parallel with each other and form a circuit tuned to the carrier frequency. The effective load of the modulator is in series with the branch of the tuned circuit containing inductance 27. Modulator tubes 18 and 19 change their transconductances with variations in the modulating signal applied to the input terminals 1 and thereby constitute a variable resistance load in the parallel tuned circuit 27—31. Variation of the effective load causes changes in the Q, i. e., the ratio of reactance to resistance, of the tuned circuit 27—31. As a consequence of such changes of the Q of the tuned circuit 27—31 and the resulting changes in the current flowing in its branches, the voltage across the load tends to remain substantially constant.

Figure 3:
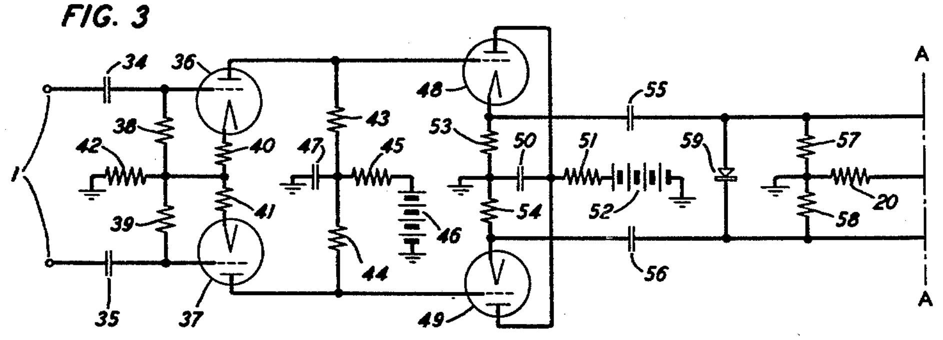
Fig. 3 shows an alternative input circuit for the modulator circuit of Fig. 2.

Fig. 3 shows an alternative input circuit which may be applied to the modulator of Fig. 2 along the line A—A. The input circuit shown in Fig. 3 comprises a two-stage balanced video amplifier and may be used to advantage in connection with certain embodiments of the present invention.

In Fig. 3, the input terminals 1 are connected, through respective coupling capacitances, to the control grids of vacuum tubes 36 and 37, respectively. For bias purposes, a pair of resistances 38 and 39 are connected in series between the control grids of tubes 36 and 37 and a pair of resistances 40 and 41 are connected in series between the cathodes of tubes 36 and 37. The points of juncture between resistances 38 and 39 and resistances 40 and 41 are connected together and grounded through another resistance 42. A pair of load resistances 43 and 44 are connected in series between the anodes of tubes 36 and 37. The junction between resistances 43 and 44 is connected through a dropping resistance 45 to the positive side of a plate supply battery 46, the negative side of which is grounded. Resistance 45 and battery 46 are shunted by a by-pass capacitance 47.

The two stages of the video amplifier are directly coupled, the anode of tube 36 being connected to the control grid of a vacuum tube 48 and the anode of tube 37 being connected to the control grid of another vacuum tube 49. The anodes of tubes 48 and 49 are connected together and grounded through a by-pass capacitance 50. A dropping resistance 51 is connected between the anodes of tubes 48 and 49 and the positive side of a plate supply battery 52. The negative side of battery 52 is grounded. The cathode of tube 48 is grounded through a resistance 53 and the cathode of tube 49 is grounded through a similar resistance 54.

Tubes 48 and 49 are operated as cathode followers. The cathode of tube 48 is connected through a coupling capacitance 55 to the control grid of modulator tube 18 in Fig. 2. The cathode of tube 49 is connected through a coupling capacitance 56 to the control grid of the other modulator tube 19 in Fig. 2. For bias purposes, the control grids of tubes 18 and 19 are grounded through respective resistances 57 and 58 and their cathodes are grounded, as in Fig. 2, through a resistance 28.

In Fig. 3, input terminals I receive a modulating signal from, for example, a balanced line. This signal is amplified and applied to the modulator shown in Fig. 2. Direct coupling is used between the two video amplifier stages to reduce shunt capacity across load resistances 43 and 44. The cathode follower stage is used to obtain a low source impedance for driving the grids of modulator tubes 18 and 19 and to reduce the potentiometer effect on the carrier voltage of a high modulating signal source impedance.

If desired, batteries 46 and 50 may be replaced by appropriate connections to battery 11 of Fig. 2. Tubes 36 and 48 and tubes 37 and 49 may be within the same envelope.

Finally, still referring to Fig. 3, a rectifier 59 may be connected between the control grids of tubes 18 and 19. The inclusion of rectifier 59 in the circuit enables the carrier amplitude to be varied in accordance with the direct current component of the balanced signal applied to input terminals I.

Although the invention has been described largely with reference to several specific embodiments, various other embodiments and modifications within the spirit and scope of the invention will occur to those skilled in the art.

What is claimed is:

1. A balanced modulator comprising a pair of electric discharge devices each including an anode, a cathode, and a control grid, a signaling source connected to said control grids, a carrier source connected to said cathodes, an output circuit connected to said anodes, a potentiometer having a movable contact and connected in circuit with said carrier source, a capacitance connected between the anode and cathode of one of said discharge devices, and a capacitance connected between the movable contact of said potentiometer and the anode of the other of said discharge devices.

2. A balanced modulator comprising a pair of electric discharge devices each including an anode, a cathode, and a control grid, said discharge devices being connected in a push-pull relationship, a signaling source connected to said control grids, a carrier source connected to said cathodes, an output circuit connected to said anodes, and means to balance out any quadrature component of carrier current introduced into said output circuit by parasitic capacitances of said discharge devices comprising a first capacitance connected between the anode and cathode of one of said discharge devices, a potentiometer connected in circuit with said carrier source, and a second capacitance connected between said potentiometer and the anode of the other of said discharge devices.

3. A balanced modulator in accordance with claim 2 in which said first capacitance is substantially half as large as said second capacitance.

4. In combination, a pair of amplifying devices each having an input circuit and an output circuit, said devices being connected in a balanced relationship, means for supplying a modulating signal to said input circuits, means for supplying a carrier frequency voltage to said devices, means for introducing a fixed amount of carrier frequency current, shifted in phase, into one of said output circuits, and means for introducing a controllable amount of carrier frequency current, shifted in phase, into the other of said output circuits.

5. In combination, a pair of amplifying devices each having an input circuit and an output circuit, said devices being connected in a push-pull relationship, a combined output circuit for said devices, means for supplying a modulating signal to said input circuits, means for supplying a carrier frequency voltage to said devices, and means to balance out any quadrature component of carrier current introduced into said combined output circuit by parasitic capacitances of said devices comprising means for introducing a fixed amount of quadrature component carrier current into the individual output circuit of one of said devices, and means for introducing a controllable amount of quadrature component carrier current into the individual output circuit of the other of said devices.

6. A balanced modulator comprising a pair of amplifying devices connected in a push-pull relationship, each of said devices including an anode, a cathode, and a control electrode, a modulating signal source connected to said control electrodes, an output circuit connected to said anodes, a carrier source connected to said cathodes, and capacitatively reactive means including a potential divider connected in circuit between said carrier source and the anode of one of said devices for introducing a variable amount of carrier current, shifted 90 degrees in phase, into the anode circuit of said device.

7. A balanced modulator including a pair of amplifying devices connected in a push-pull relationship, each of said devices having at least an anode, a cathode, and a control electrode, a modulating signal source connected to said control electrodes, an output circuit connected to said anodes, a carrier source connected to said cathodes, a potential divider connected in circuit with said carrier source, and a capacitance connected between said potential divider and the anode of one of said devices.

STEPHEN DOBA, Jr.

REFERENCES CITED

The following references are of record in the file of this patent:

UNITED STATES PATENTS

| Number | Name | Date |
|---|---|---|
| 2,243,504 | Gluyas | May 27, 1941 |